United States Patent [19]
Ikeda

[11] Patent Number: 5,696,888
[45] Date of Patent: Dec. 9, 1997

[54] VARIABLE RESOLUTION OUTPUT METHOD AND APPARATUS

[75] Inventor: Jun Ikeda, Yokohama, Japan

[73] Assignee: Canon Kabushiki Kaisha, Tokyo, Japan

[21] Appl. No.: 437,673

[22] Filed: May 9, 1995

Related U.S. Application Data

[63] Continuation of Ser. No. 133,277, Oct. 7, 1993, abandoned, which is a continuation of Ser. No. 884,995, May 18, 1992, abandoned, which is a continuation of Ser. No. 682,679, Apr. 9, 1991, abandoned.

[30] Foreign Application Priority Data

Apr. 12, 1990 [JP] Japan ................................ 2-95066

[51] Int. Cl.$^6$ ................................................ G06K 15/00
[52] U.S. Cl. ................................................ 395/102; 395/115
[58] Field of Search ........................ 395/101, 102, 395/109, 110, 112, 113, 117, 115, 116, 128, 134, 135, 133, 782; 382/298–300, 284; 358/404, 444, 261.4; 345/130, 134, 136

[56] References Cited

U.S. PATENT DOCUMENTS

| | | | |
|---|---|---|---|
| 3,895,184 | 7/1975 | Komura et al. | 358/261.1 |
| 4,546,385 | 10/1985 | Anastassiou | 358/96 |
| 4,811,249 | 3/1989 | March | 364/900 |
| 5,068,805 | 11/1991 | Tsuzuki | 395/164 |
| 5,093,903 | 3/1992 | Sudoh et al. | 395/102 |
| 5,129,050 | 7/1992 | Ikenoue et al. | 395/115 |

FOREIGN PATENT DOCUMENTS

| | | | |
|---|---|---|---|
| 12793 | 7/1980 | European Pat. Off. | 395/115 |
| 3931128 | 3/1990 | Germany | 395/115 |

*Primary Examiner*—Arthur G. Vans
*Attorney, Agent, or Firm*—Fitzpatrick, Cella, Harper & Scinto

[57] ABSTRACT

An output apparatus including a memory for storing developed image data; a unit for identifying the capacity of the memory; a unit for identifying the record area on a recording medium on which the developed image data is to be recorded; and a unit for determining a resolution to be used, in accordance with the identified record area and the identified capacity of the storage means. An output method wherein the capacity for storing developed image data is identified; an output area for the data to be outputted is identified; and an output resolution is determined in accordance with the identified capacity and the identified output area.

29 Claims, 4 Drawing Sheets

VARIABLE RESOLUTION OUTPUT METHOD AND APPARATUS

This application is a continuation of application Ser. No. 08/133,277, filed Oct. 7, 1993, now abandoned, which was a continuation of application Ser. No. 07/884,995, filed May 18, 1992, now abandoned, which was a continuation of application Ser. No. 07/682,679, filed Apr. 9, 1991, now abandoned.

BACKGROUND OF THE INVENTION

1. Field of the Invention

The present invention relates to an output method and apparatus allowing a variable resolution of output image data.

2. Related Background Art

Various recording apparatus having different printing processes are known, such as serial dot printers, thermal printers, LED printers, liquid crystal printers, and laser beam printers. Low cost and high resolution for better print quality are being achieved for print circuit portions of such recording apparatus, by introducing several techniques. Laser printers (hereinafter abbreviated as LBPs) are easier to use to improve the resolution because of their specific structure than other types of printers. Some laser printers have a resolution of 300 dpi (dot per inch) to 600 dpi or higher.

In a recording apparatus, bit image data is generated in accordance with code data supplied from a host computer or the like. For dealing with high resolution, bit image data is generated using a scalable font in place of a bit image font. A bit image font represents bit image data itself stored in a storage unit, whereas a scalable font has a variable font size such that character shape data is stored not as a bit image but as vector information, and the vector information is processed to obtain a bit image having a designated character size. The scalable font provides the advantages of a smaller memory capacity and a better print quality of a magnified character than a bit map font, which requires a memory capacity linearly increasing as the number of font sizes increases.

The resolution of such conventional recording apparatus is, however, fixed. Therefore, even if a scalable font having the above-described advantages is used, print quality is determined by the resolution specific to the recording apparatus used.

SUMMARY OF THE INVENTION

It is therefore an object of the present invention to provide an output method and apparatus capable of changing resolution in accordance with a memory capacity.

According to an aspect of the present invention, there is provided a recording apparatus having means for receiving code data from recording data supplying means, means for developing the received code data into image data, and storage means for storing the developed image data, the recording apparatus comprising means for identifying the capacity of the storage means storing the developed image data; means for identifying the record area on a recording medium on which the developed image data is to be recorded; means for determining a resolution for use in recording, in accordance with the identified record area and the identified capacity of the storage means; and means for recording the developed image data at the determined resolution.

According to another aspect of the present invention, there is provided an output apparatus comprising: storage means for storing developed image data; means for identifying the capacity of the storage means; means for identifying the record area on a recording medium on which the developed image data is to be recorded; and means for determining a resolution for use, in accordance with the identified record area and the identified capacity of the storage means.

According to a further aspect of the present invention, there is provided an output method comprising the steps of: identifying the capacity for storing developed image data; identifying an output area for the data to be output; and determining an output resolution in accordance with the identified capacity and the identified output area.

According to a still further aspect of the present invention, there is provided an output apparatus comprising: storage means for storing developed image data; means for identifying the capacity of the storage means; and means for determining the output resolution in accordance with the identification by the identifying means.

According to another aspect of the present invention, there is provided an output method comprising the steps of: identifying the capacity for storing developed image data; and determining the output resolution in accordance with the identification by the identifying means.

DETAILED DESCRIPTION OF THE PREFERRED EMBODIMENTS

In the following embodiments, the print process system of an LBP will be given by way of example for the discussion of this invention. The print process system of an LBP itself is well known in the art, so the description thereof will be omitted. The invention is not limited only to the following embodiments, but is applicable to an apparatus constructed of a single apparatus unit and to a system constructed of a plurality of apparatus units. The present invention is also applicable to the apparatus or system supplied with programs executing the concept of this invention.

Figure 1:
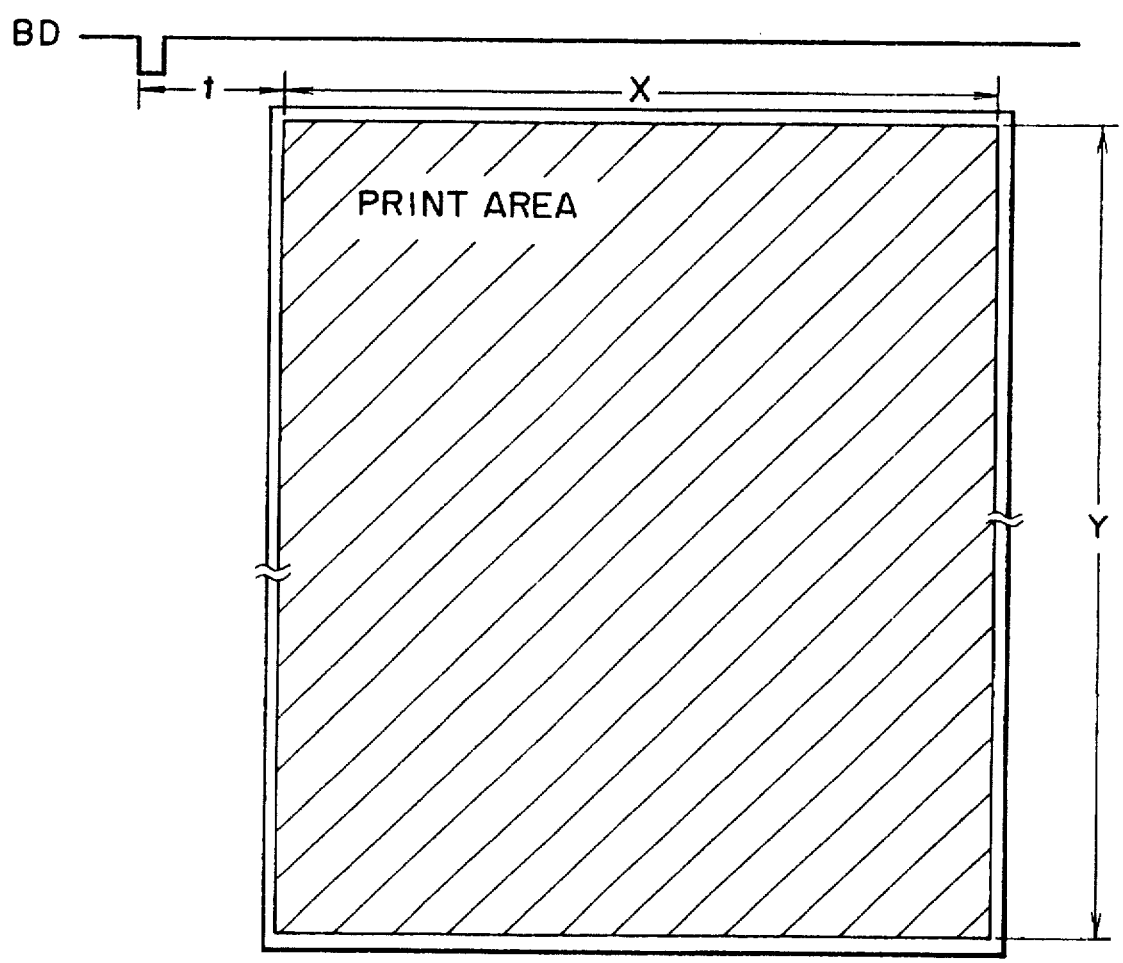
FIG. 1 shows the relationship between a horizontal synchronization signal of an LBP and a print area on a recording medium.

FIG. 1 shows the relationship between a horizontal synch signal (a beam detect signal, hereinafter called BD) of an LBP and a print area on a recording medium on which image data is to be formed. Represented by a character t is the time required for a laser beam scanned by a polygonal mirror to reach the print area after the falling edge of BD. X represents the length in the horizontal (main scan) direction of the print area, and Y represents the length in the vertical (sub-scan) direction of the print area.

Figure 2:
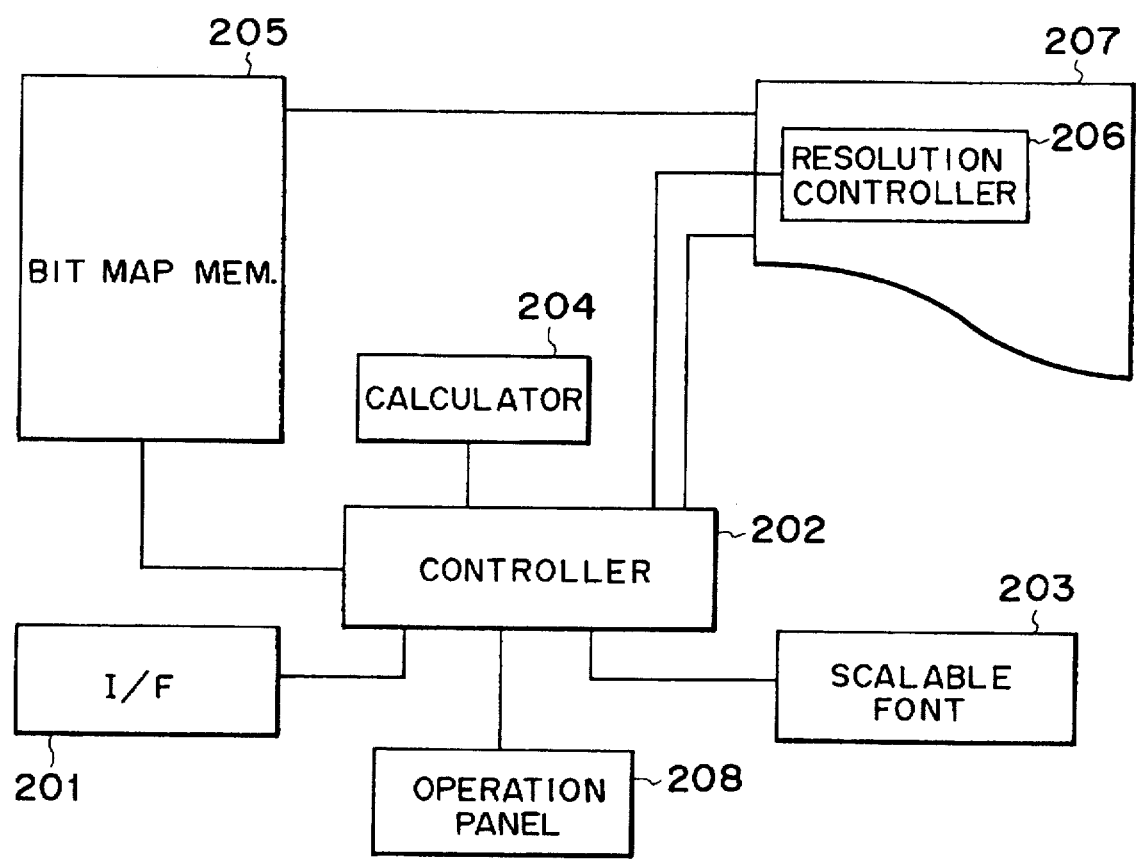
FIG. 2 is a block diagram showing a printer according to an embodiment of this invention.

FIG. 2 is a block diagram showing a recording apparatus according to an embodiment of this invention. In FIG. 2, an interface unit 201 (hereinafter referred to as I/F) receives data from a recording data source such as a host computer. A controller 202 controls the entire operation of the printing apparatus, and analyzes command data supplied from I/F 201 to generate a bit image. A scalable font unit 203 stores, in the form of vector information, character image data corresponding to character code data sent from the data source. A calculator 204 calculates a print character bit image and an available resolution. The print character bit image is calculated from the vector information by means of interpolation for a predetermined curve such as a spline curve and a Bezier curve and by means of various algorithms. The available resolution is calculated from the memory capacity presently available. A bit map memory 205 stores bit image data to be printed. A resolution controller 206 executes physical control processes for attaining an objective resolution, such as controlling the rotation of the polygonal mirror of the LBP, paper feed speed in the sub-scan direction, laser stop, development bias and the like. Such physical control processes are achieved by using devices well known in the art. An LBP engine 207 (hereinafter simply referred to as engine) is a printing system including the resolution controller 206.

Figure 3:
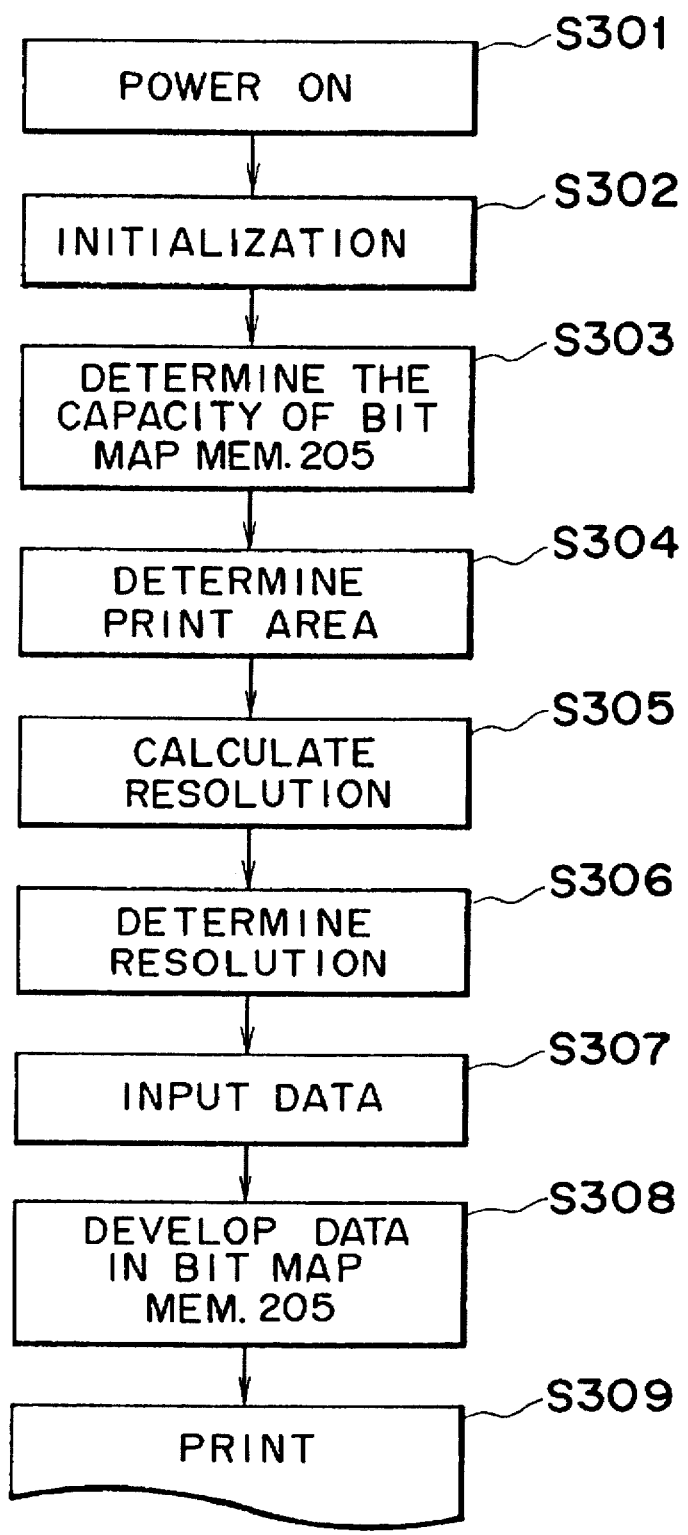
FIG. 3 is a flow chart showing a control sequence of the printer according to an embodiment of this invention.

Next, the operation sequence of the LBP will be described with reference to the flow chart shown in FIG. 3.

First, the LBP is powered on (step S301). The controller checks and clears each memory, initializes the I/F, and initializes circuit portions of the LBP by using user default values or the like stored in a non-volatile memory (step S302). The controller 202 determines the available capacity of the bit map memory 205 in accordance with a user default value or by calculating the size of a working area, buffer and the like used in the bit map memory. At step S304, a print area is determined by reading a designated record width from the setting of a record width designating switch. At step S305, a resolution is calculated in accordance with the bit map capacity and the print area. For example, if the capacity is 1012K bytes and the print area is defined as shown in FIG. 1 by X=200 mm and Y=290 mm, then the resolution is calculated by:

$$\sqrt{\text{memory capacity (bits)} \div X \div Y} \times 25.4 = \text{resolution (dpi)}.$$

i.e., $$\sqrt{1012 \times 1024 \times 8 \div 200 \div 290} \times 25.4 \approx 300 \text{ dpi}.$$

Next, the controller 202 supplies the resolution controller 206 with information that the image data to be sent is for 300 dpi, and sets the rotation speed of the polygonal mirror, paper transport speed, laser spot system and the like (step S306). The controller 202 receives codes of print character data from the data source via the I/F 201 (step S307). In accordance with the vector information stored in the scalable font 203, the controller 202 develops the bit image data into the bit map memory 205 by using the calculator 204 while ensuring the designated size at the resolution of 300 dpi (step S308). After the bit image data of one page has been developed, the controller 202 actuates the printer engine 207 and sends the data in the bit map memory 205 to the printer engine 207, so that characters are printed at the designated resolution through the printing process of the LBP (step S309).

The time t shown in FIG. 1 can be determined from the given rotation speed of the polygonal mirror because the print area on a recording medium is definitely determined with respect to the timing when a beam detector detects a laser beam and generates a beam detector signal to generate a horizontal sync signal. The controller 202 sends the bit image data to the printer engine 207 so as to start printing dots after the time t. Thereafter, dot data is sent at a clock speed suitable for the determined resolution. In generating clocks suitable for a determined resolution, a series of bit image transfer clocks may be selected from a plurality series of clocks stored in advance. Alternatively, it is preferable to use a programmable counter (electrically erasable programmable logics are now available in markets, with odd number division being allowed). Although not shown in FIG. 1, the number of BDs between a vertical synchro signal and the print area can be calculated from the determined resolution in the similar manner as above. In accordance with the calculated number, the controller 202 sends the bit image to the printer engine 207.

Figure 4:
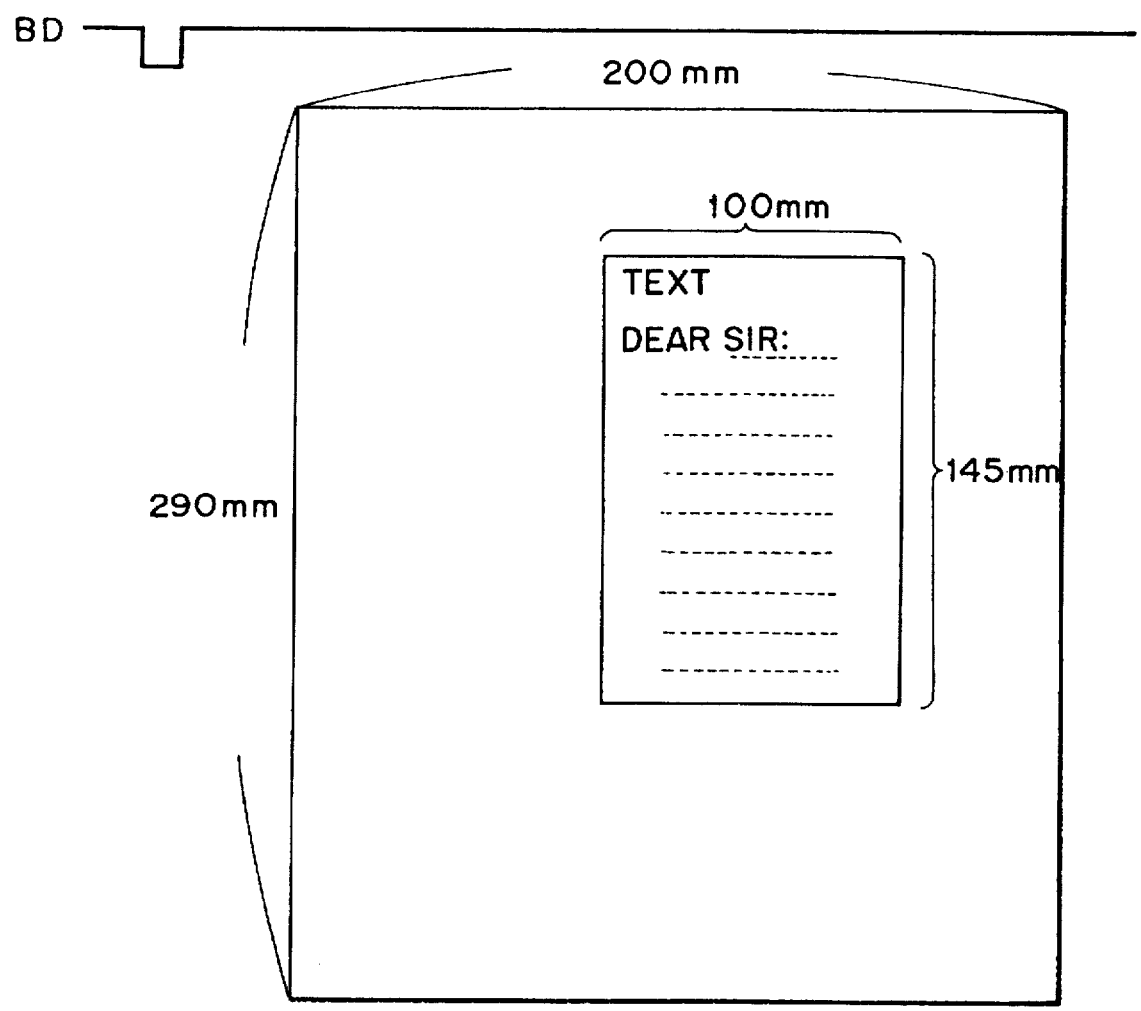
FIG. 4 shows an example of a print area for a resolution of 600 dpi relative to a print area for a resolution of 300 dpi.

In the above-described example, the whole area of the recording paper is used for printing. A user may sometimes wish to use only a partial area thereof for a given printing. For example, as shown in FIG. 4, if a partial area defined by 100 mm×145 mm of one page is intended to be used, the available resolution using the same bit map memory area (1012K bytes) is given by:

$$\sqrt{1012 \times 1024 \times 8 \div 10 \div 145} \times 25.4 \approx 300 \text{ dpi}$$

The resolution is therefore doubled. After the resolution is determined, in the same manner as above, the controller 202 causes the resolution controller 206 to set the printing process system at 600 dpi. The controller 202 then generates image data for 600 dpi in accordance with the vector information stored in the scalable font 203, the image data being four times as much as that for 300 dpi because image data two times as much as that for 300 dpi are used in both the vertical and horizontal directions. In accordance with the determined resolution of 600 dpi and the information on the print position on a recording medium, there are calculated timings of video clocks for data transfer to the engine, a top margin, left margin, and line length of the recording medium. These calculated parameters are set in a video data transfer circuit so that characters can be printed at the resolution of 600 dpi.

After the calculated parameters are set, character data for the partial record area on the recording medium is read and printed in a well known manner.

In the above-described examples, characters are printed in one continuous area (in the examples, within one rectangular area). If there are provided a plurality of margin counters and a control system for the counters, characters can be printed in a plurality of separated areas.

In the above embodiment, characters are printed on a partial area at a maximum resolution defined by the capacity of the bit map memory. The invention is not limited thereto, but a resolution lower than the maximum resolution may be set as desired. For example, if a resolution of 150 dpi is selected (under the maximum resolution of 600 dpi), then the bit map memory can be used as four page full bit map memories at 150 dpi. Further, the time required for bit image development per page is shortened, thereby improving throughput of the recording apparatus and yielding a better flexibility in use.

Instead of using the bit map memory as four-page full bit map memories at 150 dpi, it may be used for the case wherein a window is printed within a page, while ensuring a high resolution depending upon the area of the window. It is to be noted in this case that there is a tradeoff between the development time into the window and the resolution. The maximum resolution for the window is therefore determined in accordance with the memory capacity required for the window which depends on the complexity degree of image data and in accordance with the performance of development circuits.

Selecting a resolution in the above-described mode may be entered from the operation panel 208 of the LBP, or may be effected by a command supplied from the data source.

In the above embodiments, the same resolution is used for both in the vertical and horizontal directions. The same resolution is not necessarily required, but different resolutions may be set. For example, the present invention is applicable to printers having different resolutions between the vertical and horizontal directions, to printers having a variable resolution either in the vertical direction or in the horizontal direction, by incorporating a suitable algorithm.

As described so far, according to the present invention, a print operation is executed by determining a resolution from a print area and a memory capacity, thereby providing a recording apparatus capable of changing a resolution while ensuring flexibility in use. Specifically, with a given memory capacity, a small print area and a large print area each can be printed at a maximum allowable resolution. Furthermore, if a resolution selection mode is provided, the recording apparatus more flexible in use can be realized.

The "capacity of the bit map memory" in the above embodiments means the capacity of the memory itself or the capacity of an area of the memory allowing to store bit image.

What is claimed is:

1. An output apparatus comprising:

storage means for storing developed image data;

means for identifying a capacity of said storage means;

means for determining a first output area, contained within a second output area and smaller than the second output area, on which an image corresponding to the developed image data is to be output in accordance with designation information relating to the first output area;

means for determining, prior to image data developing, a resolution at which the image data is to be developed in said memory means, in accordance with the determined first output area and the identified capacity of said storage means;

means for outputting an image for the first output area corresponding to the developed image data stored in said storage means; and means for controlling said output means to output the image for the first output area at an output resolution corresponding to the determined resolution.

2. An output method comprising the steps of:

identifying a capacity of storing developed image data;

determining a first output area, contained within a second output area and smaller than the second output area, on which an image corresponding to the developed image data is to be output, in accordance with designation information relating to the first output area;

determining, prior to image data developing, a resolution at which the image data is to be developed in memory means, in accordance with the identified capacity and the determined first output area; and controlling output means to output an image corresponding to the developed and stored image data for the first output area at an output resolution corresponding to the determined resolution.

3. An output apparatus according to claim 1, wherein said means for determining output resolution is structured and arranged to determine the output resolution as high as possible in accordance with the determined record area and the capacity identified by said identifying means.

4. An output method according to claim 2, wherein said step of determining output resolution includes determining the output resolution as high as possible in accordance with the determined output area and the capacity identified in said identifying step.

5. An output apparatus according to claim 1, where said storage means also has an area for work.

6. An output method according to claim 2, wherein said storing step includes storing the developed image data in an image data storage area which also has an area for work.

7. An output control apparatus comprising:

means for identifying a resolution in accordance with a capacity of an area for storing image data and in accordance with a determined first output area, contained within a second output area and smaller than the second output area, on which an image is to be output determined in accordance with designation information relating to the first output area; and means for controlling an output resolution in the first output area in accordance with the identified resolution.

8. An apparatus according to claim 1, wherein the output resolution is changeable upon data output.

9. A method according to claim 2, wherein the output resolution is changeable upon data output.

10. An apparatus according to claim 1, wherein the developed image data is obtained from a scalable font.

11. A method according to claim 2, wherein the developed image data is obtained from a scalable font.

12. An apparatus according to claim 1, wherein the record area can be designated from a control panel.

13. A method according to claim 2, wherein the record area can be designated from a control panel.

14. A method according to claim 2, wherein the output area can be designated from a control panel.

15. An apparatus according to claim 1, wherein said apparatus is a laser beam printer.

16. An apparatus according to claim 1, wherein said apparatus is incorporated in a system comprising a plurality of apparatuses.

17. An apparatus according to claim 1, further comprising means for switching between a mode in which the output resolution is determined by said determining means and a mode in which a desired output resolution is designated in response to an instruction from outside said apparatus.

18. A method according to claim 2, wherein said method is performed in using a laser beam printer.

19. A method according to claim 2, wherein said method is performed in a system comprising a plurality of apparatus each of which performs said method.

20. A method according to claim 2, further comprising the step of switching between a mode in which the output resolution is determined in said determining step and a mode in which a desired output resolution is designated in response to an instruction from outside an apparatus performing said method.

21. An output apparatus comprising:

storage means for storing developed image data;

means for identifying a capacity of said storage means;

means for determining an output area on which an image corresponding to the developed image data is to be output in accordance with designation information relating to the output area;

means for determining, prior to image data developing, a resolution at which the image data is to be developed in said memory means, in accordance with the determined record area and the identified capacity of said storage mans;

means for outputting an image corresponding to the developed image data stored in said storage means; and means for controlling said output means to output the image at an output resolution corresponding to the determined resolution, wherein said output resolution determining means determines the output resolution in accordance with a value of $$R = \sqrt{\frac{B \times 1024 \times 8}{X \times Y}} \times 25.4,$$

where B is the capacity in Kbytes and X and Y are dimensions of the record area in mm.

22. An output method comprising the steps of:

identifying a capacity for storing developed image data;

determining an output area on which an image corresponding to the developed image data is to be output, in accordance with designation information relating to the output area;

determining, prior to image data developing, a resolution at which the image data is to be developed in memory means, in accordance with the identified capacity and the determined output area; and controlling output means to output an image corresponding to the developed and stored image data at an output resolution corresponding to the determined resolution, wherein the output resolution is determined in said output resolution determining step in accordance with a value of $$R = \sqrt{\frac{B \times 1024 \times 8}{X \times Y}} \times 25.4,$$

where B is the capacity in Kbytes and X and Y are dimensions of the record area in mm.

23. A method according to claim 2, further comprising the step of outputting the image corresponding to the developed and stored image data.

24. An apparatus according to claim 1, wherein said output means comprises means for scanning a photosensitive element with light modulated based on image data and wherein said control means controls a scanning speed of said scanning means.

25. An apparatus according to claim 24, wherein said scanning means comprises main scanning means and sub-scanning means.

26. An apparatus according to claim 25, wherein said output means comprises means for developing a latent image formed on the photosensitive element and means for transferring the developed image onto a sheet.

27. A method according to claim 2, wherein said output step comprises scanning a photosensitive element with light modulated based on image data and wherein said control step controls a sub-scanning speed of said sub-scanning step.

28. A method according to claim 27, wherein said scanning step comprises scanning in a main direction and scanning in a sub-scanning direction.

29. A method according to claim 28, wherein said output step comprises developing a latent image formed on the photosensitive element and transferring the developed image onto a sheet.

* * * * *

UNITED STATES PATENT AND TRADEMARK OFFICE
CERTIFICATE OF CORRECTION

PATENT NO. : 5,696,888

DATED : December 9, 1997

INVENTOR(S): JUN IKEDA

It is certified that error appears in the above-identified patent and that said Letters Patent is hereby corrected as shown below:

COLUMN 4
Line 7, "synchro" should read --sync--;
Line 19, " $\sqrt{1012 \times 1024 \times 8 \div 10 \div 145} \times 25.4 \approx 300 \; dpi$ " should read -- $\sqrt{1012 \times 1024 \times 8 \div 100 \div 145} \times 25.4 \approx 600 \; dpi$ --;
Line 52, "page" should read --one-page--.

COLUMN 6
Line 67, "mans;" should read --means;--.

COLUMN 8
Line 24, "sub-scanning" (second occurrence) should read --scanning--.

Signed and Sealed this

Fourteenth Day of July, 1998

Attest:

BRUCE LEHMAN

*Attesting Officer*    *Commissioner of Patents and Trademarks*